US006834999B2

United States Patent
Kim

(10) Patent No.: US 6,834,999 B2
(45) Date of Patent: Dec. 28, 2004

(54) FAN APPARATUS FOR CHAMBER OF HANDLER

(75) Inventor: Dong June Kim, Kyungki-do (KR)

(73) Assignee: Mirae Corporation, Choongchungnam-Do (KR)

( * ) Notice: Subject to any disclaimer, the term of this patent is extended or adjusted under 35 U.S.C. 154(b) by 0 days.

(21) Appl. No.: 10/058,385

(22) Filed: Jan. 30, 2002

(65) Prior Publication Data

US 2002/0186907 A1 Dec. 12, 2002

(30) Foreign Application Priority Data

Jun. 12, 2001 (KR) .......................... 2001-32970

(51) Int. Cl.⁷ ............................................. F16C 23/00
(52) U.S. Cl. ...................................... 384/278; 384/905
(58) Field of Search ................................ 384/278, 493, 384/557, 605, 905

(56) References Cited

U.S. PATENT DOCUMENTS

| | | | | |
|---|---|---|---|---|
| 3,945,694 A | * | 3/1976 | Vaillette | 384/493 |
| 4,555,189 A | * | 11/1985 | Donkin | 384/493 |
| 5,190,380 A | * | 3/1993 | Comerci | 384/493 |
| 5,211,489 A | * | 5/1993 | Moore | 384/585 |
| 5,577,847 A | * | 11/1996 | Nakamura et al. | 384/517 |
| 5,767,690 A | | 6/1998 | Fujimoto | 324/760 |
| 6,250,815 B1 | * | 6/2001 | Picone et al. | 384/557 |

* cited by examiner

Primary Examiner—Thomas R. Hannon
(74) Attorney, Agent, or Firm—Fleshner & Kim, LLP

(57) ABSTRACT

The present invention relates to a fan apparatus for a chamber of a handler which prevents the breakage of a bearing housing by a guide recess and a key slidable to the guide recess along the axis varied due to a thermal stress generated in the axial direction of the fan apparatus according to a change in temperature of the fan apparatus mounted inside the chamber. The fan apparatus includes: a first housing having a first guide recess formed; a second housing contained in the first housing and slidable therein; a bearing being installed inside the second housing and supporting the shaft; a plurality of labyrinths being installed at both sides of the bearing and supporting the bearing; and a push cover covering the second housing inserted into the first housing.

23 Claims, 5 Drawing Sheets

FAN APPARATUS FOR CHAMBER OF HANDLER

BACKGROUND OF THE INVENTION

1. Field of the Invention

The present invention relates to a fan apparatus for a chamber of a handler, and more particularly, to a fan apparatus for a chamber of a handler which can absorb deformation of a fan or shaft according to a change in temperature of the fan apparatus adapted to the chamber of the handler.

2. Description of the Related Art

A handler is used for testing electrical properties of a semiconductor part. The handler is constructed in such a manner that an elevator/tray transfer, a X-Y robot, an exchanger, and a chamber are installed on a base frame. The tray on which semiconductor parts are loaded are moved to the elevator/tray transfer, and then the semiconductor parts loaded on the tray are moved to an aligner by the X-Y robot. The semiconductor parts moved to the aligner are displaced to a test tray by the exchanger and thereafter are moved to the chamber to be tested.

The chamber includes a preheater, a test site and a defroster. The preheater preheats the semiconductor parts loaded on the test tray, and the test site tests the electric properties of the semiconductor parts loaded on the test tray which have passed through the preheater in a high temperature and low temperature state. When the testing of the semiconductor parts is finished at the test site, the tested test tray is moved to the defroster and then is discharged after the defroster makes the temperature of the semiconductor parts an ambient temperature.

To test the electric properties of the semiconductor parts at the chamber, as described above, a fan apparatus is provided inside the chamber in order to control the internal temperature of the chamber. The construction of the fan apparatus will now be described with reference to FIG. 1.

FIG. 1 is a perspective view of a fan apparatus adapted to a chamber of a handler according to the conventional art. As illustrated therein, the fan apparatus includes a rotary motor 1, a coupling 2, a shaft 3, a case 4 and a plurality of bearing housings 5.

The rotary motor 1 is installed outside the chamber (not shown), and the shaft 3 is connected to a rotary central axis 1a of the rotary motor 1 installed inside the chamber by using the coupling 2. The shaft 3 is installed inside the case 4, and grease is filled inside the case 4 in a state that the bearing housing 5 is installed at both ends of the case 4. In addition, a sensor dog (not shown) and a sensor brake (not shown) are installed at the shaft 3 installed inside the case 4 and are used for stopping the shaft 3.

The case 4 filled with the grease is installed inside the chamber, so it is directly affected by a change in the temperature of the chamber. Therefore, the semiconductor parts are tested at a high temperature/low temperature inside the chamber, the temperature of the case 4 is changed to a large extent.

In this way, when the temperature of the case 4 is changed to a large extent, the length of the shaft 3 installed inside the case 4 is changed to thus generate a thermal stress in the axial direction of the fan apparatus. Resultantly, the bearing housing is broken and thus the function of the fan apparatus is disabled.

SUMMARY OF THE INVENTION

It is, therefore, an object of the present invention to provide a fan apparatus which can absorb deformation of the length in an axial direction of the fan apparatus according to the change in temperature of the fan apparatus mounted inside the chamber that frequently changes a high temperature or low temperature state in order to test semiconductor parts in the handler.

It is another object of the present invention to provide an effect of preventing the breakage of the bearing housing due to the thermal stress generated in the axial direction of the fan apparatus according to the change in temperature of the fan apparatus mounted inside the chamber that frequently changes a high temperature or low temperature state in order to test semiconductor parts in the handler.

To achieve the above objects, in a fan apparatus installed to a chamber of a handler and a plurality of bearing housing installed to both ends of a case in which a shaft connected to a rotation central shaft of a rotation motor is installed therein, a fan apparatus comprises: a first housing having a first guide recess formed; a second housing contained in the first housing and slidable therein; a bearing being installed inside the second housing and supporting the shaft; a plurality of labyrinths being installed at both sides of the bearing and supporting the bearing; and a push cover covering the second housing inserted into the first housing.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will now be described with reference to the accompanying drawings.

Figure 1:
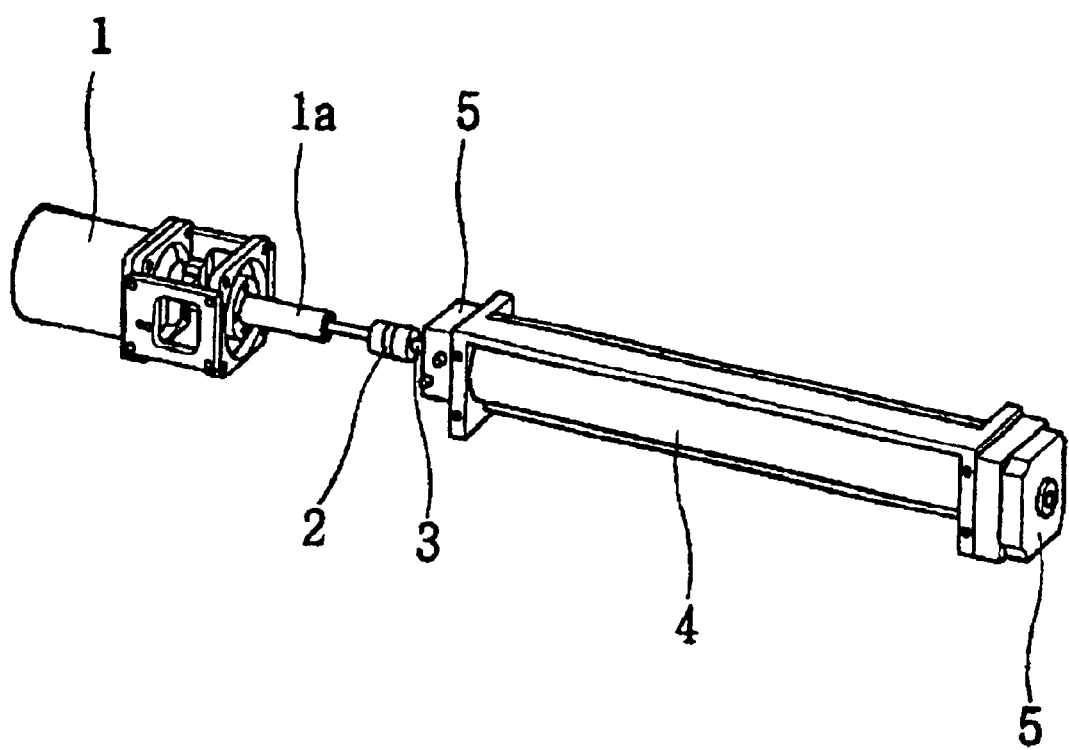
FIG. 1 is a perspective view of a fan apparatus adapted to a chamber of a handler according to the conventional art.
Figure 2:
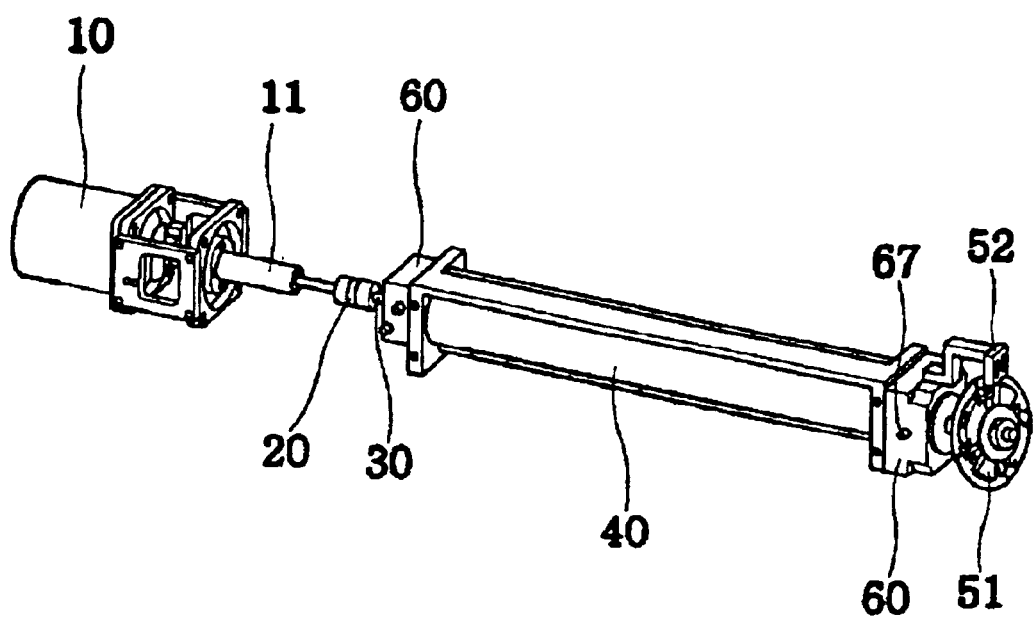
FIG. 2 is a perspective view of a fan apparatus adapted to a chamber of a handler according to the present invention.
Figure 3:
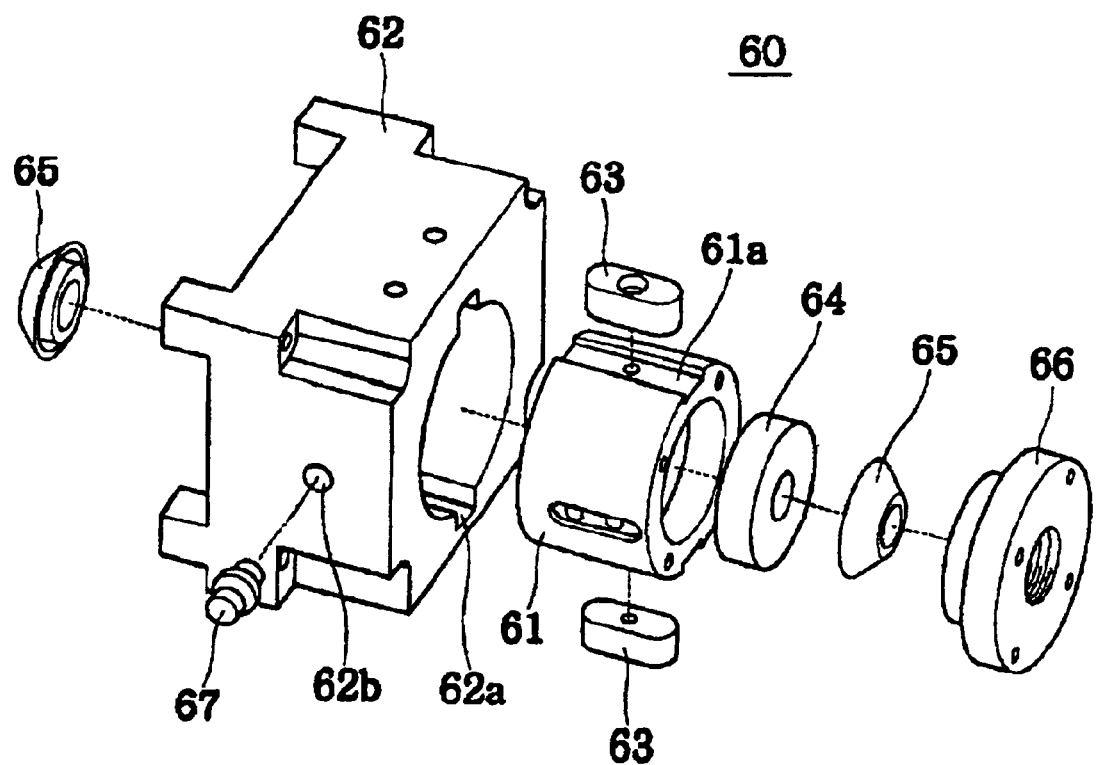
FIG. 3 is an exploded perspective view of a bearing housing as shown in FIG. 2.

FIG. 2 is a perspective view of a fan apparatus adapted to a chamber of a handler according to the present invention; and FIG. 3 is an exploded perspective view of a bearing housing as shown in FIG. 2. As illustrated therein, the fan apparatus includes: a plurality of bearing housings 60 each installed at both ends of a case 40 inside which a shaft 30 connected to a rotary central axis 11 of the rotary motor 10 by a coupling 20 is installed. One of the plurality of bearing housings 60 is provided with a second housing 61 having the bearing housing supporting the shaft 30 and a first housing 62 supporting the outer side of the second housing 61. In a case that the length of the shaft 30 is varied according to a change in temperature of the shaft 30, the second housing 61 is moved along the inner side of the first housing 62.

The construction and operation of the present invention will now be described in more detail.

The fan apparatus of the present invention includes a rotary motor 10 a coupling 20, a shaft 30, a case 40 and a plurality of bearing housings 60. At one end of the bearing housing 60, a sensor dog 51 and a sensor brake 52 are installed. The shaft 30 is connected to the rotary central axis 11 of the rotary motor 10 by the coupling 20. The shaft 30 connected to the rotary central axis 11 by the coupling 20 is installed inside the case 40, and a fan (nor shown) is installed on the outer circumferential surface of the shaft 30.

When the shaft 30 is installed inside the case 40 and the plurality of bearing housings 60 are installed at both ends of the case 40, the bearing housing 60 is filled with grease through a grease inlet 62b and is sealed with a plug 67. In this state, the fan apparatus is operated in the state of being installed inside the chamber (not shown). The temperature of the fan apparatus operated inside the chamber is changed to a large extent and thusly the length of the shaft 30 installed inside the case 40 or the length of the fan installed at the shaft 30 is changed.

When the length of the shaft 30 or fan is changed, a thermal stress is generated in the axial direction of the fan apparatus. By this thermal stress, one of the bearing housings 60 installed at both ends of the case 40 is slightly pushed. When one of the bearing housings 60 installed at both ends of the case 40 is pushed our, the function of the fan apparatus is stopped. To prevent this, in the present invention, one of the plurality of bearing housings 60 installed at both ends of the case 40 is installed in a dual structure of the second housing 61 and the first housing 62.

The bearing housing 60 having the dual structure of the second housing 61 and the first housing 62 will now be described with reference to FIG. 3. As illustrated in FIG. 3, one of the plurality of bearing housings 60 installed at both ends of the case 40 is configured to have the dual structure of the second housing 61 and the first housing 62. The bearing housing 60 supporting the shaft 30 is installed at the second housing 61, and the second housing having the bearing housing 60 is installed to support the first housing 62. In a case that the length of the shaft 30 is varied according to a change in temperature of the shaft 30, the second housing 61 is configured to be moved along the inner side of the first housing 62.

To configure the second housing 61 such that it is moved along the inner side of the first housing 62 according to a change in the length of the shaft 30, the bearing housing 60 mainly includes a second housing 61, a first housing 62, a plurality of keys 63, a bearing 64, a plurality of labyrinths 65 and a push cover 66. The bearing 64 supports the shaft 30 installed inside the case 40 and the labyrinth 65 is installed at both ends of the bearing 64 to support the bearing 64.

The bearing 64 is inserted into the second housing 61, and a plurality of second guide recesses 61a are formed on the outer circumferential surface of the second housing 61. The second housing at which the plurality of second guide recesses 61a are formed is inserted into the first housing 62.

Figure 4:
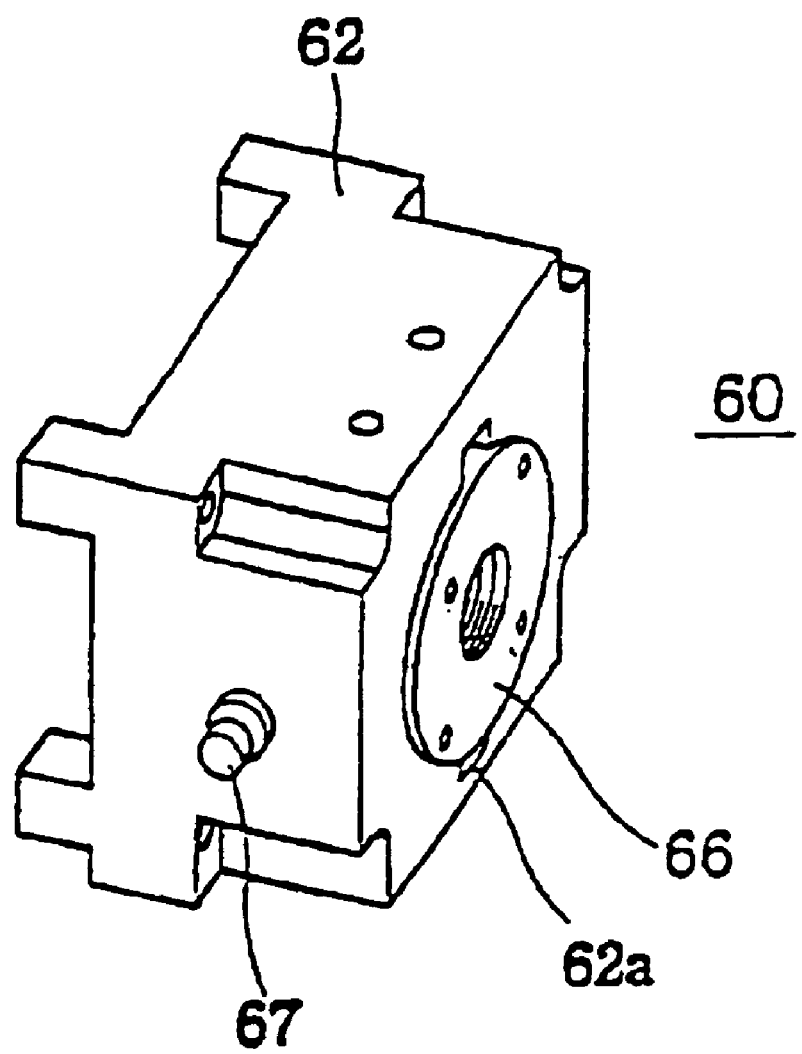
FIG. 4 is an assembly view of the bearing housing as shown in FIG. 3.
Figure 5:
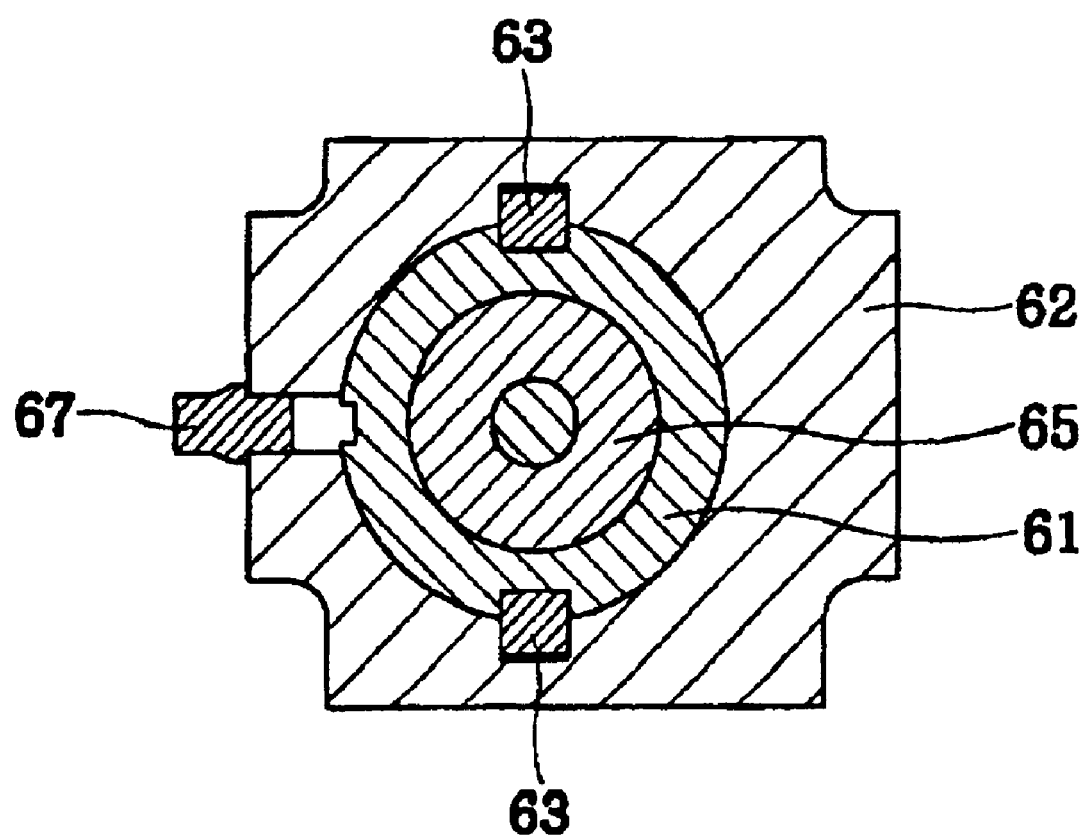
FIG. 5 is a vertical cross-sectional view of the bearing housing as shown in FIG. 4.

On the inner circumferential surface of the first housing 62, a plurality of first guide recesses 62a are formed in the direction opposite to each other. As illustrated in FIGS. 4 and 5, when the second housing 61 is inserted into the first housing 62, the plurality of second guide recesses 61a formed on the outer circumferential surface of the second housing 61 are installed facing the plurality of first guide recesses 62a.

Before the second housing 61 is inserted into the first housing 62, a plurality of keys 63 are fixed to the plurality of second guide recesses 61a. After the key 63 is installed at the second guide recess 61a, the key 63 is slidably inserted into the outer circumferential surface of the first guide recess 62a formed at the first housing 62 when the second housing 61 is inserted into the first housing 62. When the key is fixed at the second guide recess 61a and is also inserted into the first guide recess 62a, the second housing 61 can be moved along the first guide recess 62a of the first housing 62 by the key 63 at the movement of the second housing 61.

The number of the keys 63 installed at the second guide recess 61a and inserted into the first guide recess 62a is the same as the second guide recesses 61a and the first guide recesses 62a respectively formed at the second housing 61 and the first housing 62. When the key 63 is installed at the second guide recess 61a and the first guide recess 62a, the first housing 62 is fixed at the case 40 by the push cover 66, thus finishing the installation of the fan apparatus of the dual structure. Here, a hole 62b formed at the first housing 62 fixed at the case 40 is used as an inlet of grease, and it is sealed with the plug 67 when the filling of the grease is finished.

By installing the bearing housing of the dual structure at one place of the case 40 of the fan apparatus as described above, when the length of the fan (not shown) or shaft 30 installed inside the case 40 is varied according to a change in temperature and a thermal stress is generated in the axial direction of the shaft 30, the second housing 61 can be moved along the inner side of the first housing 62 according to a change in the length of the shaft 30 for thereby absorbing the thermal stress generated in the axial direction of the shaft 30.

In this way, it is possible to prevent the breakage of the bearing housing due to the thermal stress generated in the axial direction of the fan apparatus according to the change in temperature of the fan apparatus mounted inside the chamber that frequently changes a high temperature or low temperature state in order to test semiconductor parts in the handler.

As described above, the present invention provides an effect of preventing the breakage of the bearing housing due to the thermal stress generated in the axial direction of the fan apparatus according to the change in temperature of the fan apparatus mounted inside the chamber that frequently changes a high temperature or low temperature state in order to test semiconductor parts in the handler.

What is claimed is:

1. A fan apparatus configured to be installed in a chamber of a handler, the fan apparatus comprising:
    a case;
    a shaft configured to be connected to a central rotation shaft of a rotation motor, wherein the shaft is installed in the case;
    a plurality of bearing housings installed in the case, wherein at least one of the bearing housings comprises:
        a first housing portion having a plurality of first guide recesses;
        a second housing portion configured to be contained in the first housing portion and slidable therein;
        a bearing installed inside the second housing portion and configured to support the shaft and
        a plurality of labyrinths installed, respectively, at both sides of the bearing and configured to support the bearing.

2. The fan apparatus of claim 1, wherein the first housing portion further comprises a grease inlet configured to allow grease to be supplied to the bearing housing, and a plug configured to seal the grease inlet.

3. The fan apparatus of claim 1, wherein the plurality of first guide recesses are formed on an inner surface of the first housing portion.

4. The fan apparatus of claim 3, wherein the second housing portion comprises a plurality of second guide recesses formed on an outer surface of the second housing portion, and wherein the plurality of second guide recesses are formed facing the plurality of first guide recesses.

5. The fan apparatus of claim 4, further comprising a plurality of keys configured to be slidably inserted and mounted into the plurality of first guide recesses and the plurality of second guide recesses.

6. The fan apparatus of claim 5, wherein the number of keys installed into the second guide recess and inserted into the first guide recess is the same as the number of second guide recesses and the number of first guide recesses formed at the second housing portion and the first housing portion, respectively.

7. The fan apparatus of claim 4, wherein the plurality of second guide recesses are formed in a longitudinal direction on an outer surface of the of the second housing portion.

8. The fan apparatus of claim 3, wherein the plurality of first guide recesses are formed opposite each other.

9. The fan apparatus of claim 3, wherein the plurality of first guide recesses are formed extending in a longitudinal direction on an inner surface of the first housing portion.

10. The fan apparatus of claim 1, further comprising a push cover configured to cover the second housing portion when the second housing portion is inserted into the first housing portion.

11. The fan apparatus of claim 1, wherein the second housing portion is further configured to slide in a longitudinal direction within the first housing portion in response to a force applied by the shaft.

12. A fan apparatus configured to be installed in a chamber of a handler, comprising:
   a case;
   a shaft installed in the case and configured to be connected to a central rotation shaft of a rotation motor;
   a plurality of bearing housings installed at ends of the case, wherein at least one of the bearing housings comprises:
     a first housing portion;
     a second housing portion configured to be slidably joined to the first housing portion; and
     a bearing installed inside the second housing portion and configured to support the shaft.

13. The fan apparatus of claim 12, wherein the first housing portion further comprises at least one first guide recess.

14. The fan apparatus of claim 13, wherein the at least one first guide recess extends in a longitudinal direction along an inner surface of the first housing portion.

15. The fan apparatus of claim 13, wherein the second housing portion further comprises at least one second guide recess.

16. The fan apparatus of claim 15, wherein the at least one second guide recess extends in a longitudinal direction along an outer surface of the second housing portion.

17. The fan apparatus of claim 15, wherein the at least one first guide recess and the at least one second guide recess face each other when the second housing portion is joined to the first housing portion.

18. The fan apparatus of claim 15, wherein the number of first guide recesses is equal to the number of second guide recesses.

19. The fan apparatus of claim 15, further comprising at least one key configured to be inserted into the at least one second guide recess and the at least one first guide recess.

20. The fan apparatus of claim 19, wherein the number of keys is the same as the number of first guide recesses or the number of second guide recesses.

21. The fan apparatus of claim 12, further comprising at least one labyrinth installed in the second housing portion and configured to hold the bearing.

22. The fan apparatus of claim 12, further comprising a push cover configured to cover the second housing portion when the second housing portion is joined to the first housing portion.

23. The fan apparatus of claim 12, wherein the first housing portion further comprises a grease inlet configured to allow grease to be supplied to an inner portion of the first housing portion, and a plug configured to seal the grease inlet.

* * * * *